Figure 1:
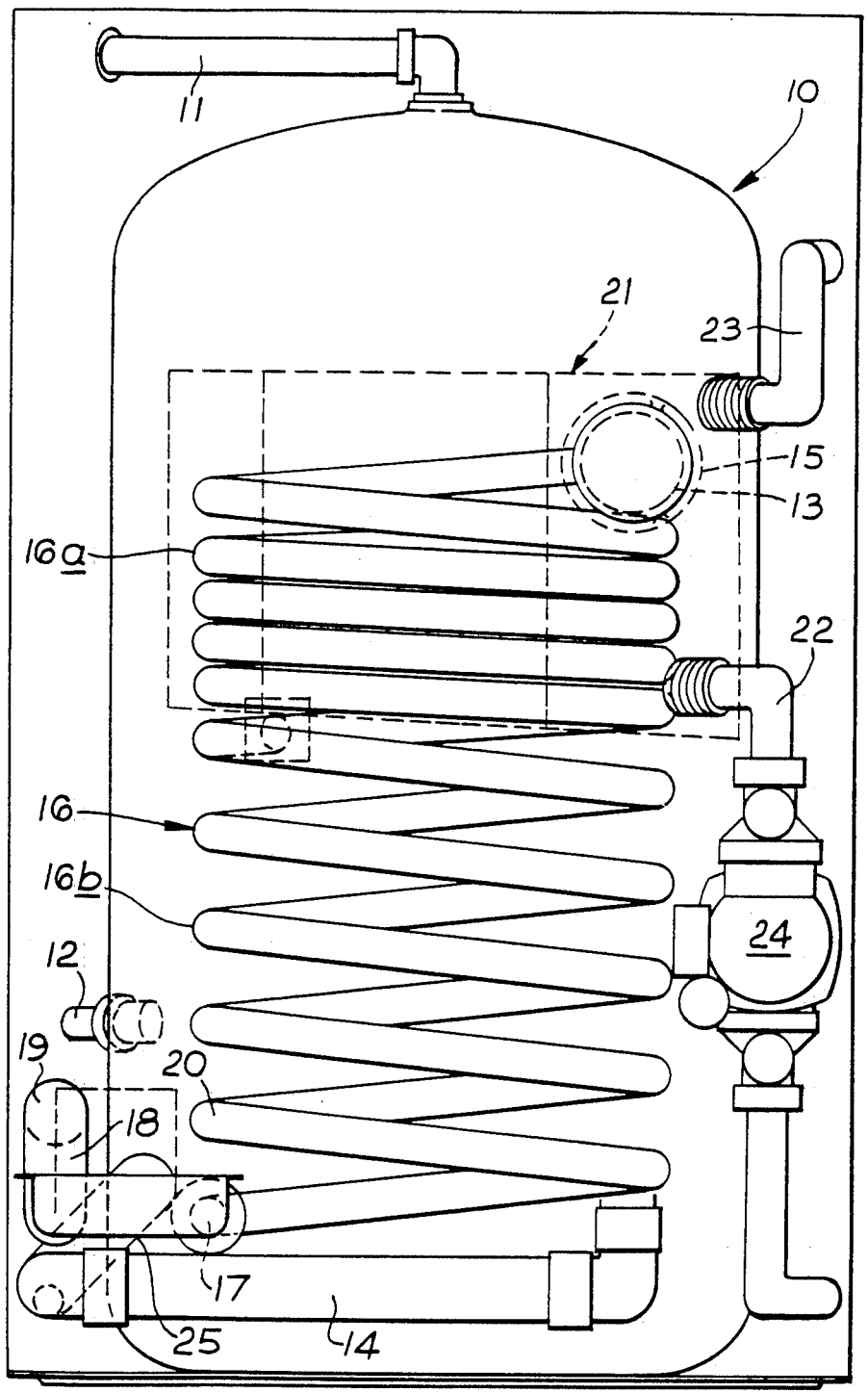

United States Patent [19]

Bowen

[11] Patent Number: 4,572,111

[45] Date of Patent: Feb. 25, 1986

[54] HEATING APPARATUS

[75] Inventor: John E. Bowen, Kings Heath, England

[73] Assignee: Condensing Boilers Limited, Birmingham, England

[21] Appl. No.: 388,226

[22] Filed: Jun. 14, 1982

[30] Foreign Application Priority Data

Jun. 19, 1981 [GB] United Kingdom ............... 8118978

[51] Int. Cl.[4] ............................................. F22B 5/02
[52] U.S. Cl. ...................................... 122/17; 237/19; 126/361
[58] Field of Search ............... 122/20 B, 16, 13 R, 122/14, 17; 237/8 R, 19; 126/365, 362, 350 R, 361, 360 A, 360 R, 366

[56] References Cited

U.S. PATENT DOCUMENTS 1,994,026  3/1935  Pierce ......................... 122/20 B X
2,048,242  7/1936  Yates ............................. 122/20 B
4,403,572  9/1983  Gerstman et al. ............... 122/20 R Primary Examiner—Henry Bennett
Attorney, Agent, or Firm—LeBlanc, Nolan, Shur & Nies

[57] ABSTRACT

Heating apparatus, typically for providing domestic central heating and hot water supply, comprises a gas or other fuel burner (13), a flue (16) extending from the burner to an outlet, a first chamber (21) operatively carrying a first body of medium, e.g. water, heated directly from an upstream zone of the flue utilized typically as the boiler of a central heating system, and a second chamber (10) operatively carrying a second body of medium, e.g. water, heated directly from a downstream zone of the flue and preferably also by indirect transfer of heat from the first chamber with which the second chamber may be in surrounding relationship, the latter chamber typically serving as the hot water cylinder for the domestic hot water supply.

9 Claims, 2 Drawing Figures

HEATING APPARATUS

DESCRIPTION

This invention relates to heating apparatus in which heat from the combustion of a fuel is transferred to a fluid medium, commonly water, and has particular but not exclusive application to domestic central heating and hot water systems.

Continually rising fuel costs and increasing emphasis on energy conservation make it increasingly desirable that heating apparatus should operate at the maximum possible efficiency, and the object of the present invention is to provide heating apparatus which is substantially more efficient and hence economical to operate than a majority of known apparatus particularly in the domestic field, yet which is of simple construction, reliable, and readily installed.

According to the invention there is provided heating apparatus comprising a fuel burner, a flue extending from the burner to an outlet, and structure defining a first chamber in immediate relationship to an upstream zone of the flue which zone contains and/or extends into close proximity to the burner and which chamber operatively carries a first body of fluid medium to be heated, and structure defining a second chamber in immediate relationship to at least a substantial downstream zone of the flue between said upstream zone and the outlet which second chamber operatively carries a second body of fluid medium to receive heat from products of combustion passing along the downstream zone in use.

The second chamber may extend to surround or be in other immediate relationship to the first chamber so that there is also heat transfer from the latter to the second body of fluid medium in use.

The apparatus will preferably be so arranged that the products of combustion operatively passing along the flue are cooled to a temperature close to that part of the second body of fluid medium which is adjacent to the second zone by the time they leave that zone, and said cooling is sufficient to condense at least a substantial part of water vapour content of or carried in said products so as to recover latent heat therefrom by transfer to said second body.

To enhance the latter effect water vapour may be added to incoming air fed to the burner, for example by utilising condensate recovered from the outlet end of the flue; and said air may also be preheated as by utilising residual heat of the spent flue gases passing from the outlet.

Figure 2:
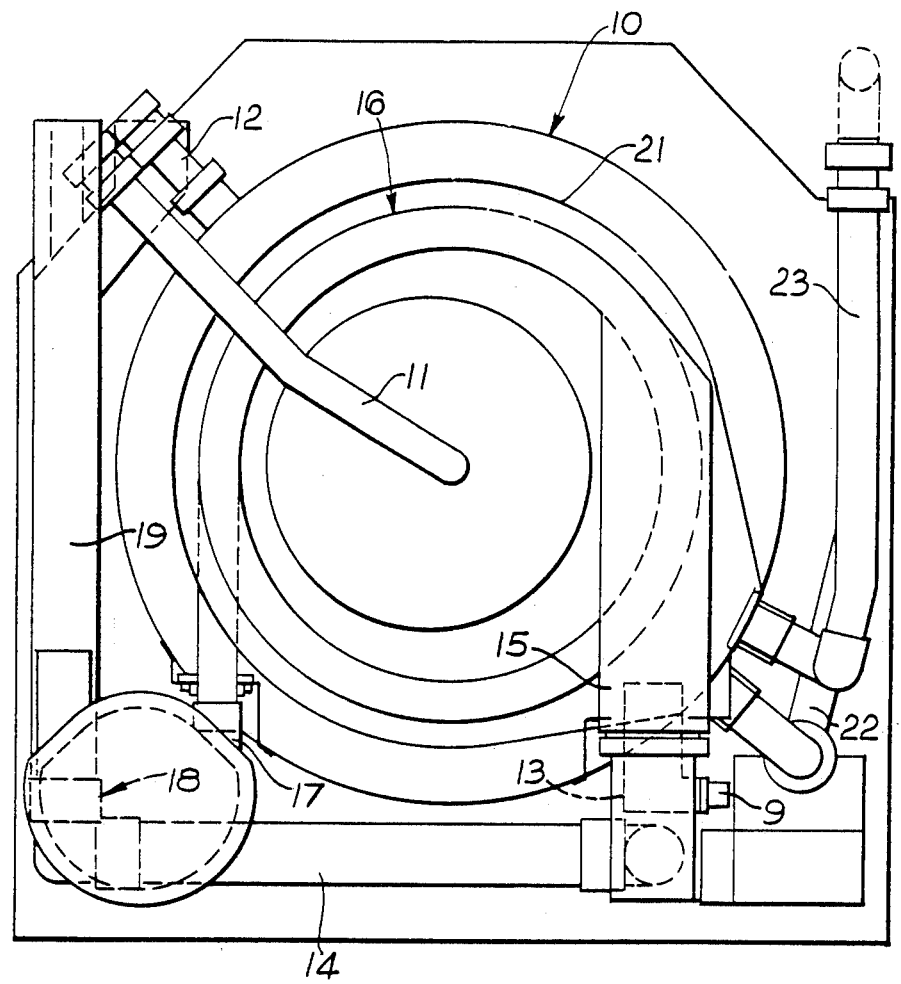

One practical example of the invention is now more particularly described as embodied in a domestic central heating and hot water system with reference to the accompanying drawings wherein:

FIG. 1 is a vertical section of heating apparatus combining a boiler and hot water cylinder, and FIG. 2 is a plan view thereof.

The apparatus shown in the drawings is cased to form a compact free standing unit compatible in size and appearance with other standard units and fittings for installation in a kitchen or other convenient location. It comprises a hot water cylinder 10 of substantial volume similar to the indirectly heated cylinders normally used in domestic systems for the hot water supply to the taps. Cylinder 10 is plumbed into the complete system in the normal way having a combined hot water draw-off and expansion pipe 11 at the top and a cold water in-feed 12 connected to a lower region thereof.

At a level approximately two-thirds of the height of cylinder 10 is mounted a gas fired burner 13 which can again be of generally conventional design as to its method of control, ignition etc. and is therefore not shown in detail and which is fed with air through an inlet duct 14 and connected to a supply of gas fuel through a gas pipe 9. (FIG. 2).

Burner 13 is located within a combustion chamber 15 extending generally horizontally within cylinder 10 at a tangent to its side wall and forming the enlarged upstream end of a flue 16 which is formed as a helical coil extending around and downwardly within cylinder 10 to a flue outlet 17 close to the bottom of cylinder 10 below the level of cold water infeed 12.

An electric fan 18 at outlet 17 induces flow along the flue and is connected in turn to an exhaust duct 19 (part only shown).

More specifically an upstream zone 16a (Fig.1) of flue 16 consisting of the combustion chamber 15 and approximately a five complete closely pitched turns of its coil down to the generally central level of cylinder 10 is followed by a downstream zone 16b of said flue in the form of three or four more steeply inclined turns of larger pitch extending downwardly to approximately the level of infeed 12 and a continuing with two final condensing coils 20, also part of said downstream zone, in the bottom region of cylinder 10 leading to outlet 17.

Said upstream zone 16a is immediately surrounded by a toroidal water jacket 21 functioning as the central heating boiler of a conventional system, i.e. heated by direct transfer from the combustion chamber 15 and said zone 16a of flue 16 immediately adjacent the burner. A first body of water carried by jacket 21 will be circulated in conventional manner through a lower central heating inlet 22 an an upper central heating outlet 23 by means of a pump 24 (FIG. 1) and/or possibly by convection circulation for room heating by means of radiators or other appliances. The central heating water circuit will be generally conventional and will not be further described. Jacket 21 is wholly within cylinder 10 though there is no connection between them, thus there is heat transfer from a first chamber constituted by jacket 21 to a second body of water, contained operatively within a second chamber constituted by cylinder 10 at the hottest upper region of the latter.

In a conventional domestic system the boiler, equivalent to jacket 21, will be the sole means of recovering useful heat from the burner combustion and efficiency of up to 75–80% only is achieved, most of the remaining heat being discharged through the boiler flue, indeed one of the considerations in constructing conventional systems has been to keep the flue hot enough to avoid condensation and ensure natural draught, even to the extent of the need to insulate an outside flue pipe.

In the case of the present system substantially all this heat will be recovered. The products of combustion leaving upstream flue zone 16a are subjected to further heat recovery by transfer to the water in the lower part of cylinder 10 as they pass through the downstream flue zone 16b including the condensing coil 20, in effect preheating the incoming cold water before it is acted on by jacket 21. The temperature of the combustion products is dropped almost to that of the water at the bottom of cylinder 10 by the time they are drawn from outlet 17. This drop in temperature causes the water vapour content of the flue gases and any additional water vapour carried therewith to condense so releasing latent heat which is transferred to the surrounding water. This latent heat may be as much as 12% of the calorific value of the fuel consumed and its recovery together with the additional cooling of the flue gases referred to above may increase total efficiency to the region of 90% or more.

The liquid condensate is drained from the lowest point of flue 16 by a trap 25 immediate upstream of fan 18.

The incoming air fed through duct 14 may be pre-heated to give further efficiency by a portion of said duct being disposed co-axially within exhaust duct 19 so that residual heat of the exhausted gases wil be utilized. The water vapour content of the incoming air may also be artificially increased as by exposure of the warm liquid condensate collecting in trap 25 to the incoming air flow.

It will be appreciated that the invention is applicable to systems burning fuel other than gas, e.g. oil fired systems, and that it may have application to industrial or other heating apparatus and/or to heat transfer to fluid media other than water, e.g. possibly hot air systems or systems in which process fluids or the like are to be heated and/or vaporised. The disposition of the flue (or flues for multiple flue tubes may be employed) and the shape and arrangement of the first chamber (in the above example water jacket 21) carrying the first body of medium and of the second chamber (in the above example cylinder 10) carrying the second body thereof may be widely varied.

In an alternative construction a coiled upstream flue zone similar to zone 16a is enclosed by a co-axial coil of larger diameter tube constituting the first chamber, this coiled construction itself being preferably contained in the second chamber e.g. an upper region of cylinder 10.

The invention might have application to flues using natural draught though induced draught is clearly preferable to ensure adequate air flow to the burner or burners and the fan may be located at any convenient position, e.g. at the air inlet to the combustion chamber instead of at the outlet as described above.

A domestic apparatus as described above could be constructed as a larger unit or "package" combining cold water feed tank(s) with electrical controls, circulating pump(s), clock programmer etc, possibly contained in a cabinet or housing, ready for connection to water and fuel supplies and the central heating and hot water circulation systems.

Having now described my invention what I claim is:

1. Heating apparatus comprising a fuel burner, flue ducting extending from the burner to an outlet along which flow products of combustion from the burner in use, and structure defining first and second chambers operatively carrying respective first and second bodies of fluid medium to be heated, the first chamber being in immediate relationship to an upstream zone of the flue ducting which zone contains or extends into close proximity to the burner, and the second chamber being in immediate relationship to a downstream zone of the flue ducting between said upstream zone and the outlet wherein the improvement comprises said chambers being in immediate surrounding relationship to said respective zones of said ducting and the second chamber being also in immediate surrounding relationship to the structure defining the first chamber whereby the second body of medium is operatively heated by heat transfer directly within said structure both from said downstream zone and from the first chamber, said first chamber being located in the upper portion of said second chamber, said second chamber having an inlet in the lower end thereof and an outlet in the upper end thereof for passage of said second body of fluid medium.

2. Heating apparatus as in claim 1, wherein the extent of the downstream zone of the flue in said relationship to the second chamber is such that the products of combustion are operatively cooled to a temperature close to that of the second body of fluid medium adjacent to said zone by the time said products leave that zone in use.

3. Heating apparatus as in claim 2, wherein said cooling is sufficient to condense at least a substantial part of water vapour content of or carried in said products in use for the recovery of latent heat from said vapour by transfer to said second body.

4. Heating apparatus as in claim 3 characterised by means for adding water vapour to incoming air operatively fed to the burner.

5. Heating apparatus as in claim 1 including means for pre-heating incoming air operatively fed to the burner by utilising residual heat of spent flue gases operatively passing from said outlet.

6. Heating apparatus as in claim 1 including means for inducing a forced draught along the flue ducting.

7. Heating apparatus as in claim 1 wherein the structure defining the first chamber is connected for flow of water being said first body of fluid medium therethrough for distribution of heat around a central heating circuit, and the structure defining the second chamber is connected to carry water being the second body of fluid medium for providing a domestic or other hot water supply separate from said central heating circuit.

8. Heating apparatus as in claim 1 wherein said downstream zone of the flue ducting extends downwardly from its upstream end to the outlet, the latter being in a lower part of the structure defining the second chamber.

9. Heating apparatus as in claim 1 wherein the first chamber is defined by a water jacket in surrounding relationship to the upstream zone of the flue ducting.

* * * * *